United States Patent
Negeri et al.

(10) Patent No.: US 9,088,930 B1
(45) Date of Patent: Jul. 21, 2015

(54) RADIO ACCESS DISCOVERY AND SELECTION

(71) Applicant: Sprint Communications Company L.P., Overland Park, KS (US)

(72) Inventors: Asfaw Negeri, Overland Park, KS (US); Rajil Malhotra, Olathe, KS (US); Imtiaz Ahmad, Overland Park, KS (US); Farni Weaver, Spring Hill, KS (US)

(73) Assignee: Sprint Communications Company L.P., Overland park, KS (US)

( * ) Notice: Subject to any disclaimer, the term of this patent is extended or adjusted under 35 U.S.C. 154(b) by 0 days.

(21) Appl. No.: 13/788,878

(22) Filed: Mar. 7, 2013

(51) Int. Cl.
*H04W 4/00* (2009.01)
*H04W 36/00* (2009.01)
*H04W 72/00* (2009.01)
*H04W 24/00* (2009.01)
*H04W 48/08* (2009.01)

(52) U.S. Cl.
CPC ..................... *H04W 48/08* (2013.01)

(58) Field of Classification Search
CPC ... H04W 8/10; H04W 60/00; H04W 28/0226; H04W 36/00; H04W 36/0061; H04W 36/12; H04W 48/08
USPC .................. 455/436, 435.2, 434, 453, 456.3; 709/205; 370/329
See application file for complete search history.

(56) References Cited

U.S. PATENT DOCUMENTS

| | | |
|---|---|---|
| 2008/0318565 A1 | 12/2008 | Stojanovski et al. |
| 2009/0316690 A1* | 12/2009 | Kim et al. ..................... 370/352 |
| 2010/0061316 A1* | 3/2010 | Levenshteyn et al. ........ 370/329 |
| 2010/0234042 A1* | 9/2010 | Chan et al. .................... 455/453 |
| 2011/0021212 A1* | 1/2011 | Chen et al. ................. 455/456.3 |
| 2011/0040836 A1* | 2/2011 | Allen et al. ................... 709/205 |
| 2011/0044253 A1 | 2/2011 | Zisimopoulos |
| 2012/0259985 A1 | 10/2012 | Koskela et al. |
| 2013/0023267 A1 | 1/2013 | Ong et al. |
| 2013/0109301 A1 | 5/2013 | Hakola et al. |
| 2013/0295940 A1* | 11/2013 | Chan et al. .................... 455/437 |

\* cited by examiner

*Primary Examiner* — Opiribo Georgewill

(57) ABSTRACT

Embodiments of the present invention direct a mobile device to communicate using a particular radio access technology when multiple access technologies are available. Many mobile devices have the capability to use multiple radio access technologies. The process of providing access guidance to the mobile device at a point in time is described herein as a radio access discovery and selection event. Embodiments of the present invention may complete the event using only two messages. In one embodiment, the first message is a SIP OPTIONS message communicated from the mobile device to the access guidance component. This message identifies the mobile device and the mobile device's present location. In one embodiment, the location identification information is communicated within the PANI header. In response, the access guidance component communicates a preferred radio access technology within a SIP 200 OK message.

16 Claims, 6 Drawing Sheets

RADIO ACCESS DISCOVERY AND SELECTION

SUMMARY

Embodiments of the invention are defined by the claims below. A high-level overview of various embodiments of the invention is provided to introduce a summary of the systems, methods, and media that are further described in the detailed description section. This summary is neither intended to identify key features or essential features of the claimed subject matter, nor is it intended to be used as an aid in isolation to determine the scope of the claimed subject matter.

Embodiments of the present invention direct a mobile device to communicate using a particular radio access technology when multiple access technologies are available. Many mobile devices have the capability to use multiple radio access technologies. For example, a mobile device may have the option of connecting to a radio access network using Wi-Fi technology, CDMA technology, or LTE technology.

A service provider may maintain an access guidance component to provide guidance to the mobile devices connecting to the service provider's network. The process of providing access guidance to the mobile device at a point in time is described herein as a radio access discovery and selection event. Embodiments of the present invention may complete the event using only two messages. In one embodiment, the first message is a SIP OPTIONS message communicated from the mobile device to the access guidance component. This message identifies the mobile device and the mobile device's present location. In one embodiment, the location identification information is communicated within the P-Access-Network-Info (PANI) header in the SIP OPTIONS. In response, the access guidance component communicates a preferred radio access technology within a SIP 200 OK message.

BRIEF DESCRIPTION OF THE SEVERAL VIEWS OF THE DRAWINGS

Illustrative embodiments of the invention are described in detail below, with reference to the attached drawing figures, which are incorporated by reference herein, and wherein.

DETAILED DESCRIPTION

Figure 1:
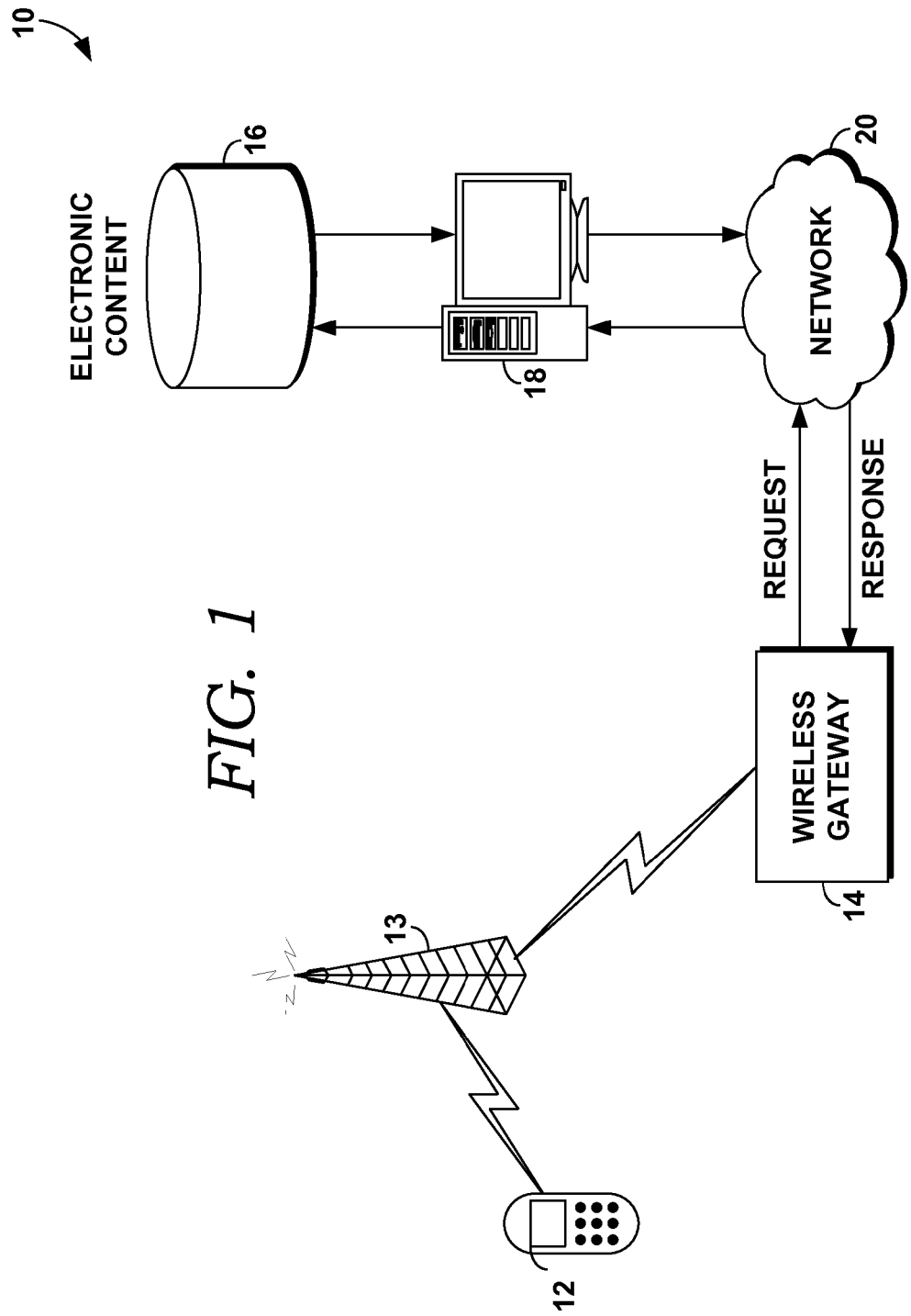
FIG. 1 is a network diagram of an exemplary telecommunications system according to embodiments of the invention.

Embodiments of the invention provide systems, methods, and computer-readable storage media with computer-readable instructions embodied thereon for controlling a preferred Access Technology list. The terms "step," "block," etc. might be used herein to connote different acts of methods employed, but the terms should not be interpreted as implying any particular order, unless the order of individual steps, blocks, etc. is explicitly described. Likewise, the term "module," "component," etc., might be used herein to connote different components of systems employed, but the terms should not be interpreted as implying any particular order, unless the order of individual modules, components, etc., is explicitly described.

Embodiments of the present invention direct a mobile device to communicate using a particular radio access technology when multiple access technologies are available. Many mobile devices have the capability to use multiple radio access technologies. For example, a mobile device may have the option of connecting to a radio access network using Wi-Fi technology, CDMA technology, or LTE technology.

A service provider may maintain an access guidance component to provide guidance to the mobile devices connecting to the service provider's network. The access guidance component manages a series of policies that prioritize the use of different connection technologies under different conditions. Exemplary conditions include both present network usage and intended use of the connection. For example, when the intended use is to make a telephone call then a first access technology may be preferred whereas a second access technology may be preferred to download a song. Network usage may be evaluated and connection guidance provided to reduce congestion on a particular access technology.

In addition to network conditions, other circumstances may be evaluated. For example, Wi-Fi may be prioritized except when the mobile device appears to be moving above a threshold velocity that is likely to take the device out of the Wi-Fi range rapidly.

The process of providing access guidance to the mobile device at a point in time is described herein as a radio access discovery and selection event. Embodiments of the present invention may complete the event using only two messages. In one embodiment, the first message is a SIP OPTIONS message communicated from the mobile device to the access guidance component. This message identifies the mobile device and the mobile device's present location. In one embodiment, the location identification information is communicated within the PANI header in the SIP OPTIONS. In response, the access guidance component communicates a preferred radio access technology within a SIP 200 OK message.

In addition to preferred radio access technology, fallback access options may be listed within the SIP 200 OK message. The fallback options may be used by the mobile device when the preferred option is not available for some reason.

A radio access discovery and selection event may be triggered for a mobile device in different circumstances. In one embodiment, the radio access discovery and selection event is triggered every time the mobile device powers on. In another embodiment, the event is triggered at designated periods during the day. For example, the mobile device may trigger the event during periods of known heavy network usage, such as during rush hour. Other trigger events are possible.

Telecommunications Environment

An overview of a telecommunications system will be described, with reference to a network diagram of FIG. 1, which illustrates an exemplary wireless network system 10. Wireless network system 10 includes mobile device 12, a wireless gateway 14, a database 16 including electronic content, a database server 18, and an information network 20, such as the World Wide Web (WWW). However, none of the embodiments of the invention are limited to these components and more, fewer, or other components can also be used in wireless network system 10. For simplicity, only one wireless gateway 14, database 16, and database server 18 are illustrated in FIG. 1. However, embodiments of the invention also contemplate multiple gateways, databases, and database servers.

Exemplary mobile devices 12 include a mobile phone, a personal digital assistant (PDA), a one- and two-way pager, a smartphone, a tablet, an e-reader, a laptop, and other devices. Mobile devices 12 may include devices that typically connect using a wireless communications medium such as radio frequency (RF) devices, infrared (IR) devices, or integrated devices combining one or more of the preceding devices. A mobile device, as described herein, refers to any type of wireless phone, handheld device, personal digital assistant (PDA), BlackBerry®, smartphone, digital camera, or other mobile devices capable of communicating wirelessly. One skilled in the art will appreciate that mobile devices will also include a processor and computer-storage media to perform various functions. In embodiments of the invention, computing devices can also refer to devices that are running applications of which images are captured by the camera in a mobile device. A mobile device can also be referred to as user equipment (UE).

The mobile devices 12 encompass a general computing system used in accordance with embodiments of the invention. A mobile device computing system includes a bus that directly or indirectly couples a memory region, one or more processors, one or more presentation components, input/output ports, input/output components, and a power supply. The bus may be representative of one or more busses, such as an address bus, data bus, or any combination thereof.

The information network 20 is configured to allow network connections between a client device and other networked devices, such as database server 18. The information network 20 may be configured to employ a means of communicating information from one computing device to another, such as through a universal serial bus (USB) port, Ethernet link, or any combination thereof. In one embodiment, the information network 20 may be the Internet, or may include local area networks (LANs), wide area networks (WANs), or direct connections.

Information network 20 may further employ a plurality of wireless access technologies including, but not limited to, $2^{nd}$ (2G), $3^{rd}$ (3G), and $4^{th}$ (4G) generation radio access for cellular systems, Wireless-LAN, or Wireless Router (WR) mesh. Access technologies such as 2G, 3G, 4G, 4G LTE, and future access networks may enable wide area coverage for network devices with various degrees of mobility. For example, the information network 20 may enable a wireless network connection over one of the aforementioned access technologies using a protocol for wireless data transfer such as Global System for Mobile communication (GSM), General Packet Radio Services (GPRS), Enhanced Data GSM Environment (EDGE), and Wideband Code Division Multiple Access (WCDMA).

The wireless gateways 14 can provide a Code Division Multiple Access (CDMA), Wideband CDMA (WCDMA), Time Division-Synchronous CDMA (TD-SCDMA), Advanced Mobile Phone Service (AMPS), Digital AMPS (D-AMPS), Universal Mobile Telecommunications System (UMTS), Radio Frequency (RF), Personal Communication Network (PCN), Global System for Mobile Communications (GSMC), Worldwide Interoperability for Microwave Access (WiMAX), Generic Packet Radio Services (GPRS), Personal Communications Services (PCS), Cellular Digital Packet Data (CDPD), Wireless Application Protocol (WAP), Digital Audio Broadcasting (DAB), 802.11a, 802.11b, or other types of wireless interfaces for the mobile devices 12. The WAP includes several protocols and standards designed to provide mobile devices with access to electronic content, and it was developed as an alternative to other markup languages and protocols developed for the World Wide Web. One component of the WAP is a Wireless Markup Language (WML), which includes markup tags, and provides control over formatting and layout of electronic content. The WML is often more appropriate to use for mobile devices such as wireless phones than other markup languages such as Hyper Text Markup Language (HTML), etc.

The wireless gateway 14 may be virtually any device that forwards network traffic. Such a device may include, for example, a router, a proxy, a firewall, an access point, a link load balancer, a device that performs network address translation, or any combination of the preceding devices. The wireless gateway 14 may recognize packets that are part of a particular communication protocol or are the same network connection or application session. The wireless gateway 14 may perform special processing on such packets including granting access to a client machine, logging or not logging an event, or network address and port translation.

The database 16 includes electronic content such as text, hypertext, graphical data or references to graphical data images, audio, video, and other content. The electronic content may be stored as a web page or WAP page on a database server, such as server 18. The server 18 can facilitate downloading electronic content from the database 16 to the mobile device 12.

Server 18 includes any computing device capable of establishing or maintaining a network connection with a mobile device. In one embodiment, server 18 is configured to operate as a web server. The server 18 can also operate as a messaging server, File Transfer Protocol (FTP) server, chat server, media server, or online gaming server. In addition, server 18 can be a single component in a larger online application. Devices that can operate as server 18 include, but are not limited to, personal computers, multiprocessor systems, microprocessor-based or programmable consumer electronics, network personal computers, or integrated devices combining one or more of the preceding devices.

Although FIG. 1 illustrates mobile devices 12 in communication with server 18, as can be appreciated, mobile devices 12 can wirelessly communicate with other computing devices, such as other mobile devices.

The mobile devices 12 illustrated in FIG. 1 operate as part of the wireless network system 10, for example, based on standards proposed by the Institute of Electrical and Electronic Engineers (IEEE), International Telecommunications Union-Telecommunication Standardization Sector (ITU), Internet Engineering Task Force (IETF), Wireless Application Protocol (WAP) Forum, Java Community, the American National Standard Institute (ANSI), or other proprietary standards.

Each mobile device 12 is coupled to a communication tower 13 via a wireless link, as illustrated in FIG. 1. In embodiments, each mobile device 12 is capable of communicating with the communication tower 13 using multiple frequency bands. A frequency band is a selected frequency range in the electromagnetic spectrum. Selected frequency bands are designated for use with wireless communications such as wireless telephony. In some cases, the mobile devices 12 may use frequency bands, frames, air-interface allocation units (slots), etc. specified by the WiMAX specifications. The communication tower 13 may be any wireless system that provides the air interface to mobile devices 12. Communication tower 13 includes a base transceiver station (BTS). Communication tower 13 may include transceivers, power amplifiers, combiners, duplexers, and antennas. Communication tower 13 may also include other components, such as a control function or control computer.

Mobile communication technology can use various standards and protocols to transmit data between a base transceiver station (BTS) of the communication tower 13 and a mobile device 12. A first mobile device may be using a first frequency band. A second mobile device may be using a second frequency band. The first mobile device may be associated with a first wireless interface with the communication tower 13, while the second mobile device may be associated with a second wireless interface with the communication tower 13. An alternative embodiment uses multiple communication towers, such as communication tower 13, that each communicate at one or more frequency bands. A wireless interface may correspond to an uplink communication from the mobile device 12 to the communication tower 13, or a downlink communication from the communication tower 13 to the mobile device 12.

Embodiments of the invention include, among other things, a method, system, or set of instructions embodied on one or more computer-readable storage media to select the correct access technology. Computer-readable storage media include both volatile and nonvolatile media, removable and nonremovable media, and media readable by a database and various other network devices. By way of example, and not limitation, computer-readable media may comprise computer storage media and communication media. Computer storage media includes both volatile and nonvolatile, removable and nonremovable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

An operating environment for devices and interfaces used for embodiments of the invention include a processing system with one or more high-speed central processing unit(s) (CPU), or other types of processors, a memory component, and a data storage component. The embodiments of the invention are described below with reference to acts and symbolic representations of operations or instructions that are performed by the processing system, unless indicated otherwise. Such acts and operations or instructions are referred to as being computer executed, CPU executed, or processor executed. The memory locations where data bits are maintained are physical locations that have particular electrical, magnetic, optical, or organic properties corresponding to the data bits.

Figure 2:
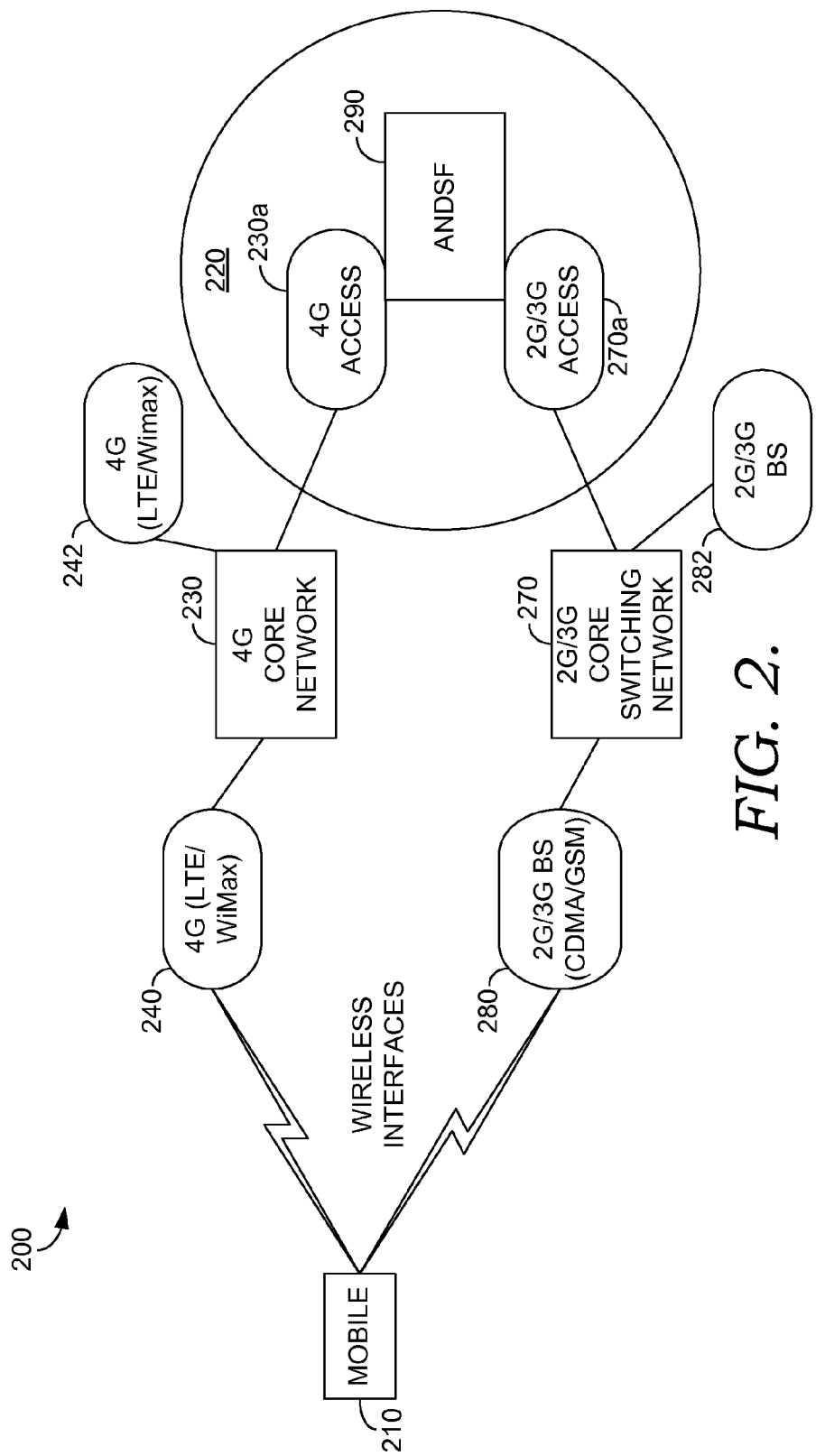
FIG. 2 is a network diagram that illustrates a core communications network according to embodiments of the invention.

FIG. 2 is a network diagram of an exemplary communications system 200 where the mobile device 210 has the option of communicating with multiple access networks according to embodiments of the invention. Communications system 200 illustrates multiple access networks in which one or more mobile devices, such as mobile device 210 communicate with a core network 220. A first access network is illustrated as a 4G access network 230. The mobile device 210 accesses the 4G access network 230 through 4G (LTE/WiMax) eNodeB 240 radio communications equipment. FIG. 2 illustrates that multiple eNodeBs 242 utilize the 4G access network 230.

FIG. 2 also illustrates a 2G/3G core switching network 270. The 2G/3G network 270 is accessed by mobile device 210 through one or more base stations (BS), such as 2G/3G base stations 280. The 4G access network 230 and the 2G/3G access network 270 are just two nonlimiting examples of access networks available for the mobile device 210 to communicate with the core network 220. Other access networks are contemplated by embodiments of the invention.

Each access network includes one or more radio coverage cells, which are associated with the particular radio communication equipment used (4G eNodeB 240 and 2G/3G base station 280). Each radio coverage cell provides a radio interface to the mobile device 210. Such an access network can include node elements, such as gateways, radio network controllers, etc. that support each cell. Mobile device 210 is shown in coverage cells for both the 4G eNodeB 240 and 2G/3G base station 280.

The core network 220 provides functions such as mobility management, session management, user management, and roaming, to name just a few. Core network 220 supports multiple types of access networks and includes functions specific to a particular access network. As illustrated in FIG. 2, the core network 220 can support a 4G access part of core network 230a and a 2G/3G access part of core network 270a.

An Access Network Discovery and Selection Function (ANDSF) server 290 is also part of the core network 220. The ANDSF server 290 provides mobile devices, such as mobile device 210, with policies and access network selection information within an access network. The ANDSF server 290 contains data management and control functionality necessary to provision network discovery and selection assistance data as per operators' policy. The ANDSF server 290 is able to initiate data transfer to the mobile device 210 based on network triggers and respond to requests from the mobile device 210. The ANDSF server 290 provides maintenance of the network, as well as network optimization. Such a server can also provide load sharing between the different networks, such as the 4G access network 230 and the 2G/3G access network 270.

Figure 3:
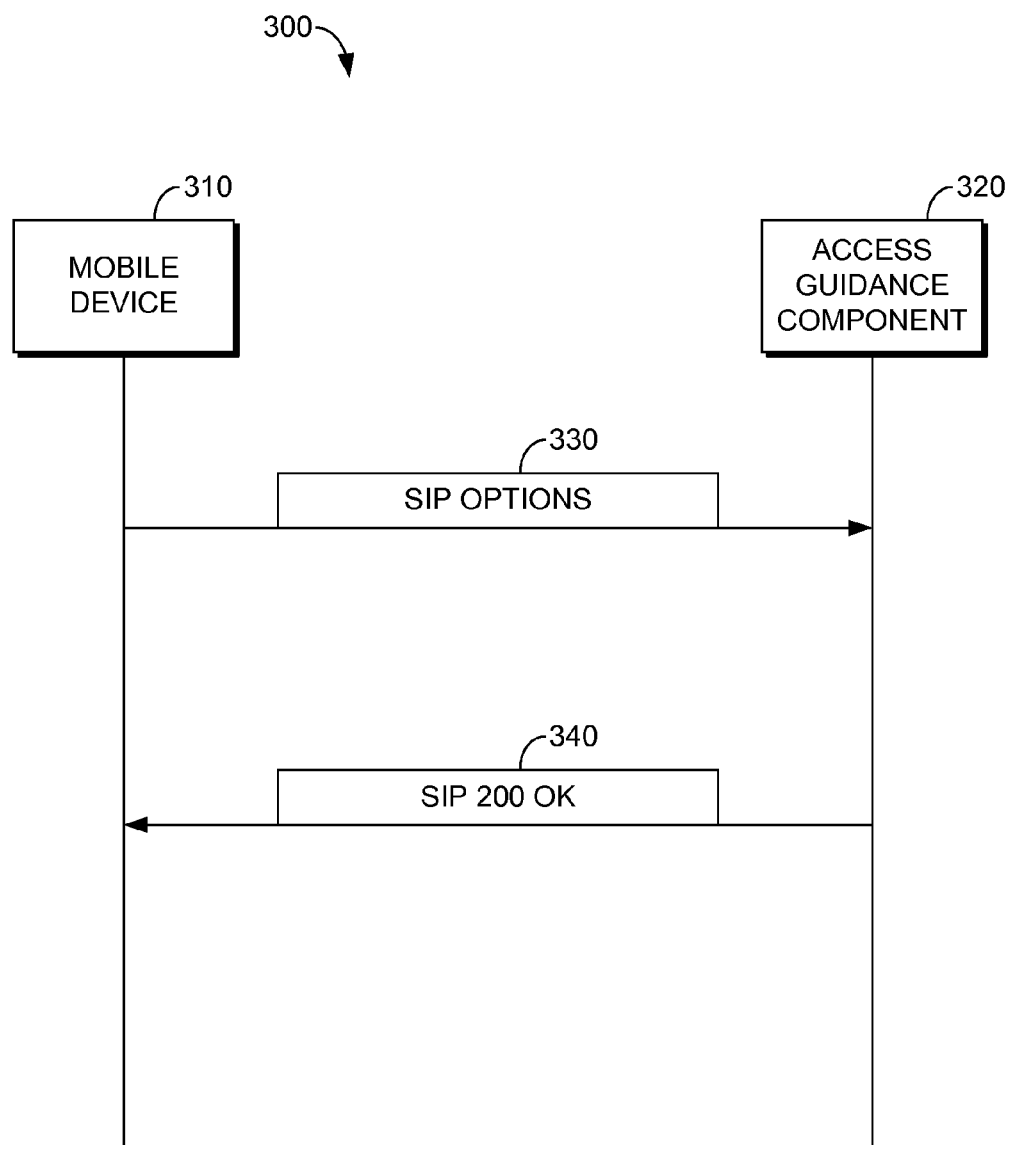
FIG. 3 is a sequence diagram that illustrates communications occurring during an access discovery and selection event, according to embodiments of the invention.

Turning now to FIG. 3, communications occurring during a radio access discovery and selection event are shown, in accordance with an embodiment of the present invention. The communications shown occur between a mobile device 310 and an access guidance component 320 within telecommunications environment 300. The telecommunications environment 300 may be similar to the environments described previously with reference to FIGS. 1 and 2. In one embodiment, the access guidance component 320 is an ANDSF server.

Initially, a SIP OPTIONS message 330 is communicated from the mobile device 310 to the guidance component 320. The SIP OPTIONS message 330 includes a location identifier and may have a max forward field set to zero. Additionally, the SIP OPTIONS message 330 is addressed to the guidance component 320. As mentioned, the location information may identify a cell tower or other access point within the network that is being used by the mobile device. GPS or other location data could also be used to identify the location of the mobile device.

The guidance component 320 evaluates the location of the mobile device 310 and the various access technologies that are presently available at that location. The various access technologies may be stored within a table that is accessible by the guidance component 320. The table may assign a priority to each of the radio access technologies that are available. An exemplary table is shown below as Table 1.

TABLE 1

| Current UE_Location LTE Cell ID | AccessType = CDMA | AccessType = WiFi |
|---|---|---|
| LA_1 Cell_Id = Cell_1 | RulePriority = 1 SID = SID_1: NID = CDMA800 Base_ID = Base_ID_1 RulePriority = 2 SID = SID_1: NID = CDMA1900 Base_ID = Base_ID_1 | RulePriority = 3 SSD = SSD_1: NID = CDMA800 Base_ID = Base_ID_1 RulePriority = 4 SID = SID_1: NID = CDMA1900 Base_ID = Base_ID_1 |
| LA_2 Cell_Id = Cell_2 | SID = SID_2: NID = NID_2 Base_ID = Base_ID_2 | |
| LA_3 Cell_Id = Cell_3 | SID = SID_3: NID = NID_3 Base_ID = Base_ID_3 | |
| ... | ... | |
| LA_n Cell_Id = Cell_n | SID = SID_n: NID = NID_n Base_ID = Base_ID_n | |

Different categories of access technologies are listed in the columns. The first column lists the current LTE cell technology, the second column lists CDMA access technology, and the third column lists Wi-Fi technology. In general, the Wi-Fi access points are enterprise access points provided by the service provider. As can be seen, each available access point has a different priority. In this case, the CDMA 800 technology has the first priority.

A different table may be used for different circumstances. One table may be a default table that is independent of conditions and generally attempts to place mobile devices on a default connection. The default connection could be the highest quality connection, the most efficient connection, the most cost-effective connection, or based on some other selection criteria. Other tables may be specific to particular conditions. For example, if a music application is opened, then a connection optimized or suitable for streaming music or videos may be selected from a table that prioritizes connections for music download. Conversely, if a call application is opened, a connection most suitable for making a telephone call may be selected from a table that prioritizes connections according to call quality.

In another situation, the network conditions are evaluated and priorities are adjusted based on network conditions to direct the mobile device to connections that have more availability. In this way, the guidance component provides a load-balancing function between the various access technologies.

Once the access technology is selected by the guidance component, the preferred radio access technology is communicated within a SIP 200 OK message 340 that is communicated from the guidance component 320 to the mobile device 310. The mobile device receives the message and attempts to connect to the preferred radio access technology.

Figure 4:
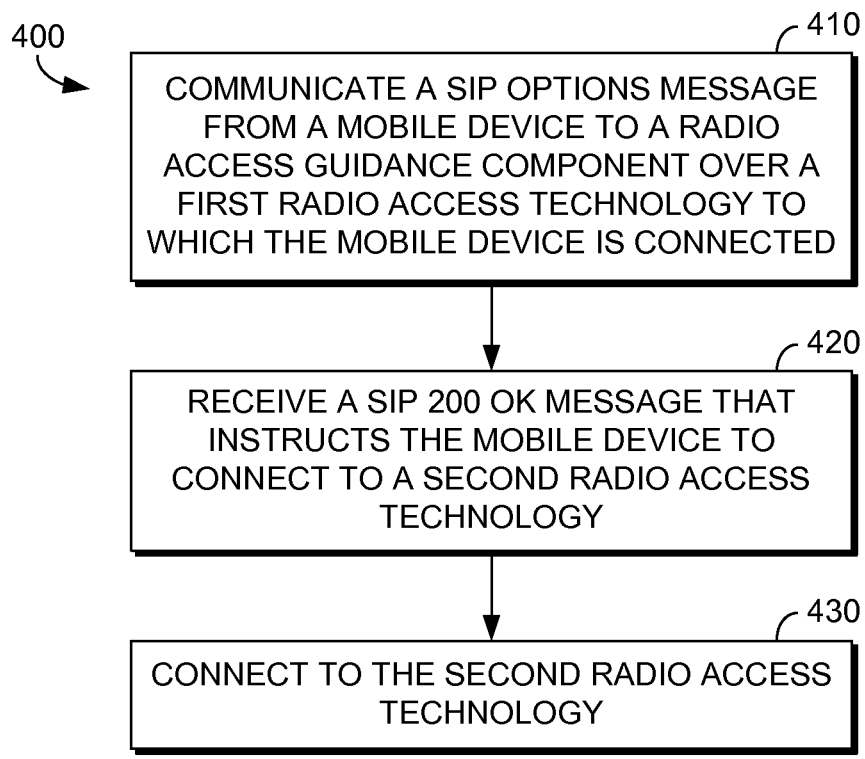
FIG. 4 is a flow diagram illustrating a method for providing access guidance to a mobile device according to embodiments of the invention.

Turning now to FIG. 4, a method 400 for providing access network guidance is shown, in accordance with an embodiment of the present invention. At step 410, a SIP OPTIONS message is communicated from a mobile device to a radio access guidance component. The message is communicated over a first radio access technology to which the mobile device is connected. As mentioned previously, the SIP OPTIONS message may identify a location of the mobile device and be addressed to a radio access guidance component. In response to receiving the message, the access guidance component may generate or select a preferred radio access technology given the current network conditions and overall technology priority.

At step 420, a SIP 200 OK message is received. The message instructs the mobile device to connect to a second radio access technology. The first and second radio access technologies are different. This indicates that the mobile device has multiple access technologies to choose from at its present location. At step 430, the mobile device connects to the second radio access technology. The mobile device may connect to the second access technology at a time that is convenient for the mobile device. For example, the first SIP OPTIONS message may have been communicated upon power up. The mobile device may connect to the second radio access technology the first time the user of the mobile device performs a function that consumes data or generates a need for a connection to the radio access network.

Figure 5:
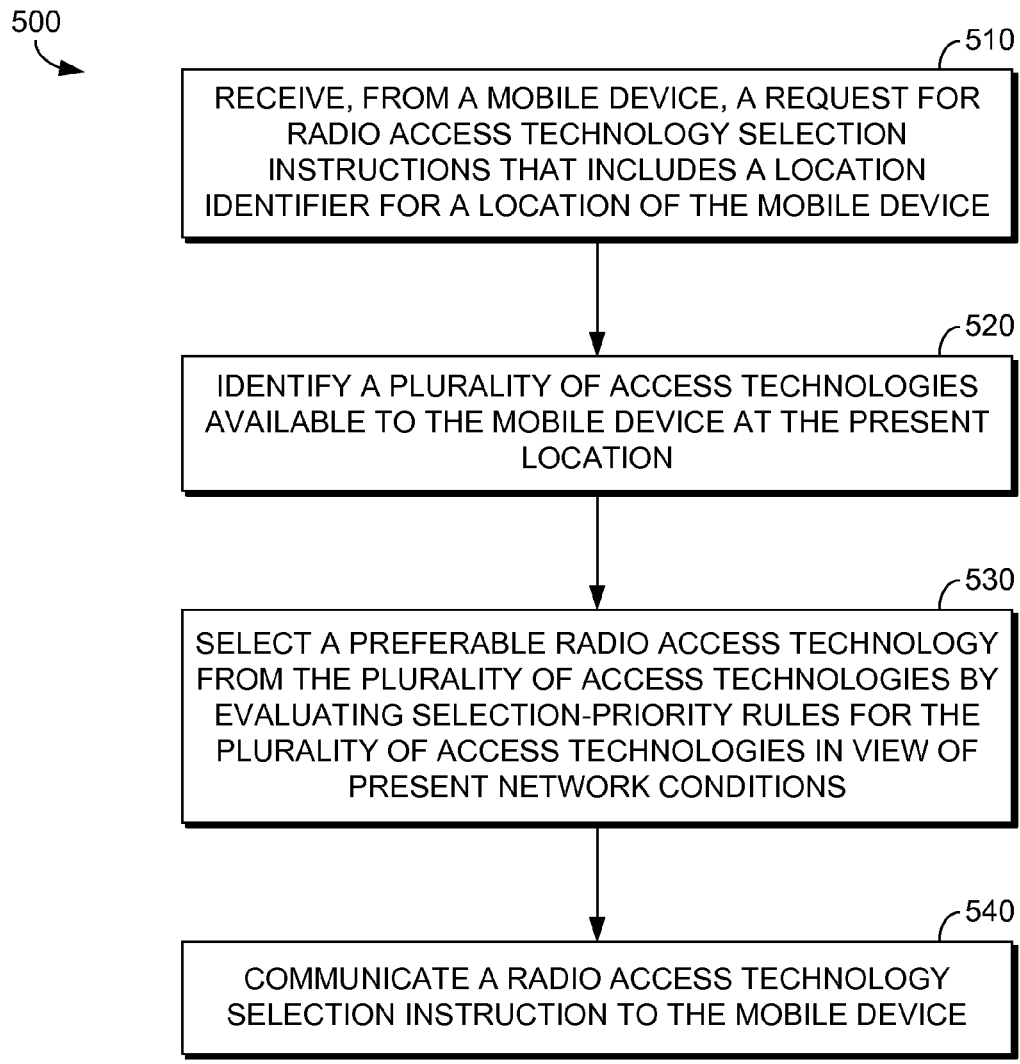
FIG. 5 is a flow diagram illustrating a method for providing access guidance to a mobile device according to embodiments of the invention.

Turning now to FIG. 5, a method 500 for providing access guidance to a mobile device is shown, in accordance with an embodiment of the present invention. At step 510, a request for radio access technology selection instructions that includes a location identifier for a location of the mobile device is received from the mobile device. The location identifier may identify the mobile device's location through a cell tower ID, identification information for an access node, or other base station component that is able to identify the location of the mobile device at least within the network. A more precise location of the mobile device may be provided using GPS or some other function.

At step 520, a plurality of access technologies available to the mobile device at the present location is identified. The access technologies may be identified using a table that associates or lists all the access technologies available at a particular cell tower or network location.

At step 530, a preferable radio access technology is selected from the plurality of access technologies by evaluating selection-priority rules for the plurality of access technologies in view of present network conditions. As mentioned, the selection-priority rules prioritize different available access technologies. In this case, the selection-priority rules are sensitive to present network conditions. For example, access technologies that are near capacity may be given a lower priority than access technologies that have greater availability. At step 540, a radio access technology selection instruction is communicated to the mobile device.

Figure 6:
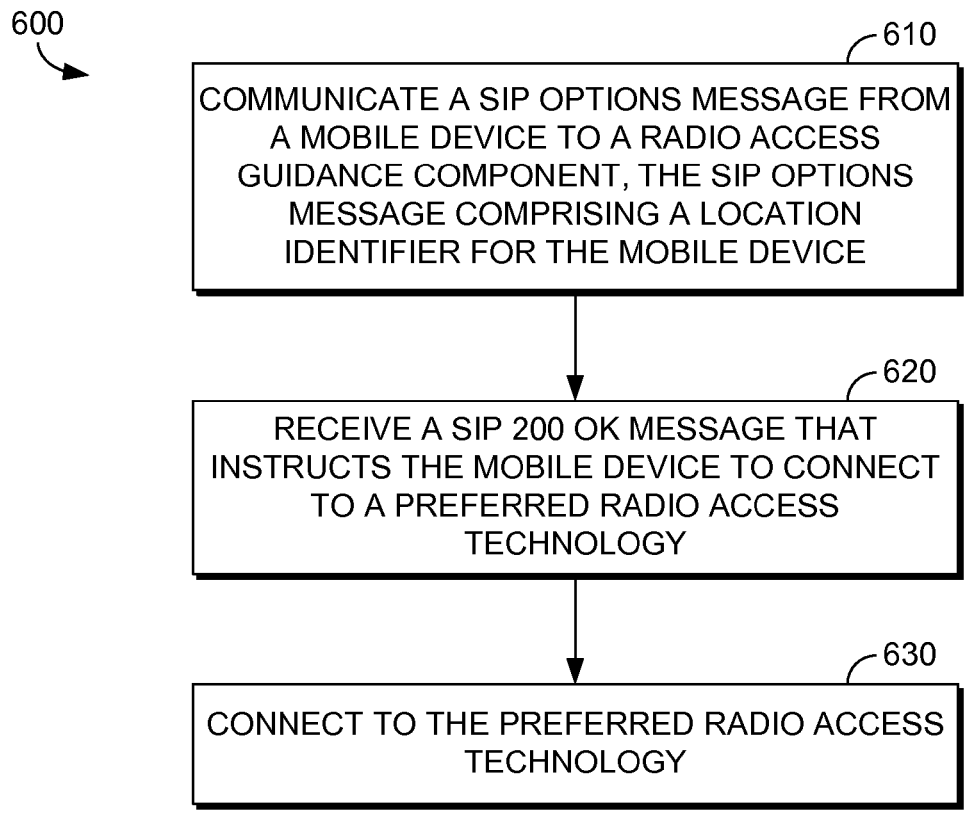
FIG. 6. is a flow diagram illustrating a method for providing access guidance to a mobile device according to embodiments of the invention.

Turning now to FIG. 6, a method 600 of providing access guidance to a mobile device is shown, in accordance with an embodiment of the present invention. At step 610, a SIP OPTIONS method is communicated from a mobile device to a radio access guidance component over a first radio access technology to which the mobile device is connected. The SIP OPTIONS message comprises a location identifier for the mobile device. At step 620, a SIP 200 OK message is received that instructs the mobile device to connect to a preferred radio access technology. At step 630, the mobile device connects to the preferred radio access technology.

Many different arrangements of the various components depicted, as well as components not shown, are possible without departing from the spirit and scope of the several embodiments of the invention. Embodiments of the invention have been described with the intent to be illustrative rather than restrictive. It will be understood that certain features and subcombinations are of utility and may be employed without reference to other features and subcombinations and are contemplated within the scope of the claims.

The invention claimed is:

1. A method for providing access guidance to a mobile device comprising:
communicating a SIP OPTIONS message from a mobile device to a radio access guidance component over a first radio access technology to which the mobile device is connected, wherein the SIP OPTIONS message is communicated in response to a trigger, wherein the trigger is one or more of the mobile device powering on, the mobile device connecting to a different radio access technology, and reaching a designated time of day;
receiving a SIP 200 OK message that instructs the mobile device to connect to a second radio access technology;
connecting to the second radio access technology.

2. The method of claim 1, wherein the SIP OPTIONS message identifies a present location and access technology in use of the mobile device.

3. The method of claim 2, wherein the present location is identified by identification information for a connection point to which the mobile device is connected.

4. The method of claim 3, wherein the identification information is transmitted within a P-Access-Network-Info (PANI) header within the SIP OPTIONS message.

5. The method of claim 1, wherein a max-forward field within the SIP OPTIONS message is set to zero.

6. One or more nontransitory computer-readable storage media storing computer-readable instructions thereon, that when executed by a computing device, perform a method providing access guidance to a mobile device, the method comprising:
receiving, from a mobile device, a SIP OPTIONS message request for radio access technology selection instructions that includes access technology and a location identifier for a present location of the mobile device, wherein the SIP OPTIONS message is communicated in response to a trigger, wherein the trigger is one or more of the mobile device powering on, the mobile device connects to a different radio access technology, and reaching a designated time of day;
identifying a plurality of access technologies available to the mobile device at the present location;
selecting a preferable radio access technology from the plurality of access technologies by evaluating selection-priority rules for the plurality of access technologies in view of present network conditions and location identifier; and
communicating a radio access technology selection instruction to the mobile device.

7. The media of claim 6, wherein the request is a SIP OPTIONS message and the selection instruction is in a SIP 200 OK message.

8. The media of claim 6, wherein the location identifier is an identification for an access node used by the mobile device.

9. The media of claim 6, wherein the present network conditions include present usage data for each of the plurality of access technologies.

10. The media of claim 6, wherein the selection-priority rules favor another access technology connections when available.

11. The media of claim 6, wherein the request and the selection instructions are the only two messages communicated during the mobile device's radio access discovery and selection event.

12. One or more nontransitory computer-readable storage media storing computer-readable instructions thereon, that when executed by a computing device, perform a method providing access guidance to a mobile device, the method comprising:
communicating a SIP OPTIONS message from a mobile device to a radio access guidance component, the SIP OPTIONS message comprising a location identifier for the mobile device, wherein the SIP OPTIONS message is communicated in response to a trigger, wherein the trigger is one or more of the mobile device powering on, the mobile device connects to a different radio access technology, and reaching a designated time of day;
receiving a SIP 200 OK message that instructs the mobile device to connect to a preferred radio access technology; and
connecting to the preferred radio access technology.

13. The media of claim 12, wherein the location identifier is a cell tower identification or access point identification.

14. The media of claim 12, wherein the SIP OPTIONS message and the SIP 200 OK messages are the only two messages communicated during the mobile device's radio access discovery and selection event.

15. The media of claim 12, wherein the location identifier is transmitted within a P-Access-Network-Info (PANI) header within the SIP OPTIONS message.

16. The media of claim 1, wherein the first radio access technology is LTE and the second preferred radio access technology is Wi-Fi.

* * * * *